Dec. 1, 1970          R. K. BARRON          3,544,674
METHODS FOR FORMING ARTICLES OF SIMULATED STONE
Filed April 20, 1967          5 Sheets-Sheet 1
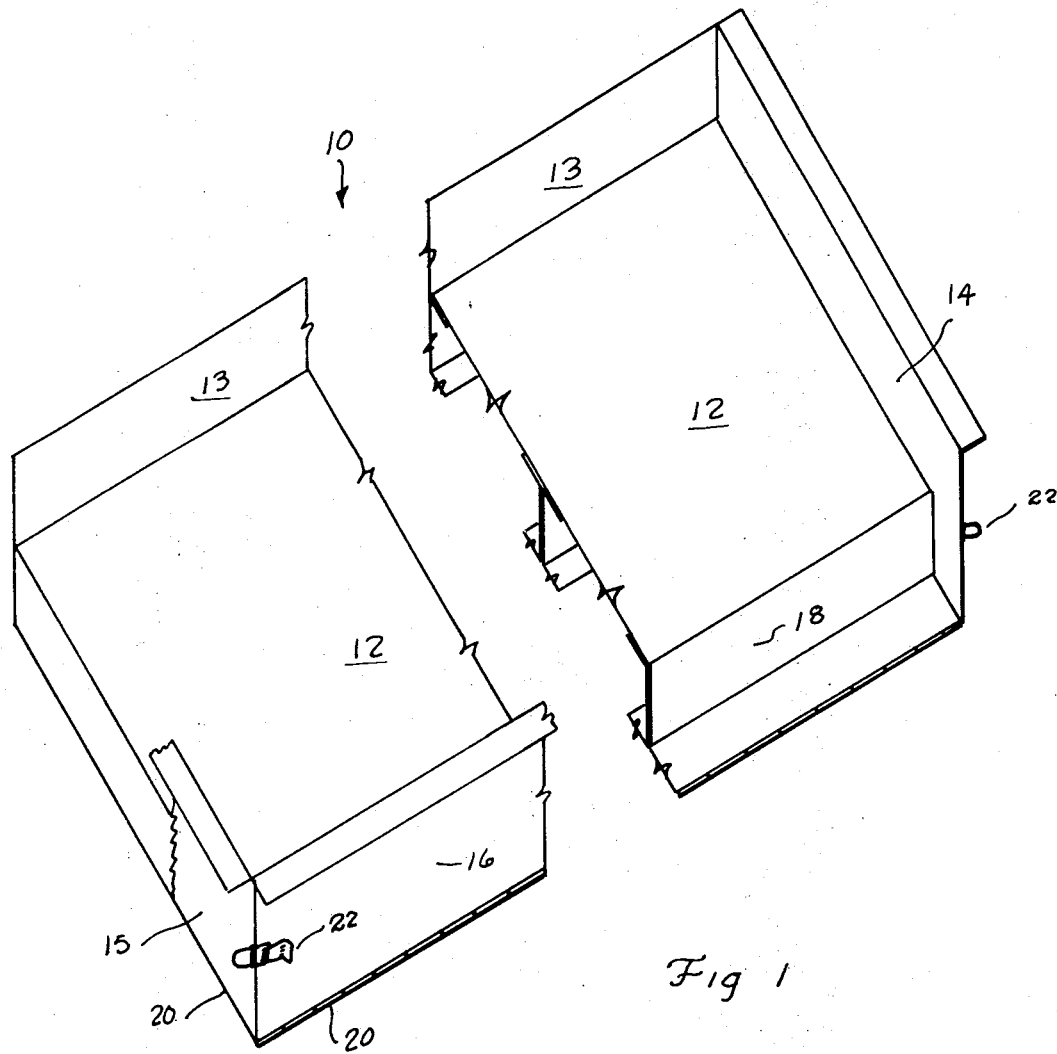
Fig 1
Fig 2
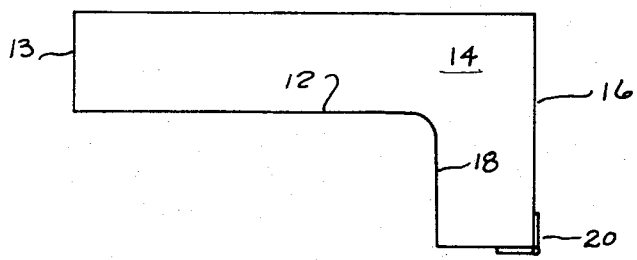
Russell K. Barron
INVENTOR.
BY Dec. 1, 1970     R. K. BARRON     3,544,674
METHODS FOR FORMING ARTICLES OF SIMULATED STONE
Filed April 20, 1967     5 Sheets-Sheet 2

Russell K. Barron
INVENTOR.

BY Donald Gunn

Dec. 1, 1970 R. K. BARRON 3,544,674
METHODS FOR FORMING ARTICLES OF SIMULATED STONE
Filed April 20, 1967 5 Sheets-Sheet 4

Russell K. Barron
INVENTOR.

BY Donald Gunn

Dec. 1, 1970    R. K. BARRON    3,544,674
METHODS FOR FORMING ARTICLES OF SIMULATED STONE
Filed April 20, 1967    5 Sheets-Sheet 5

Russell K. Barron
INVENTOR.

3,544,674
METHODS FOR FORMING ARTICLES
OF SIMULATED STONE
Russell K. Barron, 6419 Bissonnet,
Houston, Tex. 77036
Filed Apr. 20, 1967, Ser. No. 632,433
Int. Cl. B29c *21/00, 5/08*
U.S. Cl. 264—255     3 Claims

ABSTRACT OF THE DISCLOSURE

In the formation of simulated stone articles having a variety of sizes and shapes, the preferred apparatus including a table having a molding surface, support means therebelow for bearing the weight of the mixture of materials forming the simulated stone thereon, a plurality of springs mounting the table for vibratory movement while yet maintaining same in a horizontal plane beneath a radiant heat means which cures the materials to hardness. Additional molding apparatus including male and female members for forming an integral counter top and basin are used cooperatively with the molding surface. Sub-combination apparatus including edge defining members releasably attachable to the molding surface for defining edges, curves, openings, and the like.

SUMMARY OF PROBLEM AND SOLUTION

Articles of simulated stone have been known for some period of time. By way of example, reference is made to U.S. Pats. 1,131,740 and 2,296,453 which are exemplary of the prior art methods and apparatus over which the present invention distinguishes. While these prior art references are not precisely devoted to the problem of forming articles of simulated stone, they do provide a basic representation of the prior art.

Certain problems arise from use of apparatus known in the prior art, not the least of which are those relating to the make-up time for preparing apparatus for extended production of simulated stone articles. In further particular, the speed with which simulated stone articles can be formed is also related to the curing time. Moreover, the devices of the prior art are particularly lacking in flexibility in that the length and width of the finished articles is difficult to change and usually requires new molding apparatus. Moreover, departure from a simple rectangular pattern can be exceedingly difficult since the molds are unalterable, and curved edges have been heretofore difficult to obtain. Enclosed openings, such as appropriately spaced openings found in counter tops for plumbing fixtures and the like present problems utilizing devices of the prior art. The above problems compound the delays in using the apparatus of the prior art and it will be appreciated that the prior art is generally limited because of a general inability to form devices of planar construction. Simulated stone articles having construction in the third dimension as is necessitated in providing a backsplash on a counter top are difficult to produce with the apparatus of the prior art.

With a view of the limitations on the methods and apparatus taught by the prior art, the present invention is summarized as providing a preferred embodiment incorporating a molding surface within a plurality of walls defining the shape of the means to be formed, means for assisting the curing of the viscous ingredients comprising the simulated stone, means for defining desired edges of whatever irregular nature desired, including knockout holes or the like, and further including means for forming irregular shapes such as sinks and countertops generally characterized by a non-planar configuration.

It is an object of the present invention to provide improved process for forming simulated stone articles from ingredients for which make-up time is minimized, such as in the steps of sizing the mold, and obtaining special shapes.

Another object of the present invention is to provide a new and improved method for forming simulated stone articles which provides a level molding surface which is spring mounted to permit motor driven agitation and vibration and yet wherein the agitation distributes the material evenly and equally to fabricate a device of consistent thickness.

One object of the present invention is to provide a new and improved method for integrally forming a sink basin in a countertop.

An important object of the present invention is to provide a new and improved method for forming an integral simulated stone countertop from a viscous mixture having solid particles therein for strength and decor in which the planar portion of the countertop is joined to a projecting edge useable as a back splash wherein the solid particles are evenly distributed in the finished product.

An important object of the present invention is to provide a new and improved apparatus useable with a standardized method for forming simulated stone articles having a variety of sizes and shapes, including straight parallel edges as desired, or curvatures of any predetermined radius.

Other objects and advantages of the present invention will become more readily apparent from a consideration of the specification and drawings wherein:

FIG. 1 is a perspective view of a rectangular molding table for use in forming simulated stone articles;

FIG. 2 is a sectional view taken along the line 2—2 of FIG. 1 for illustrating details of the rolled, backsplash forming means in the table of FIG. 1;

Figure 3:
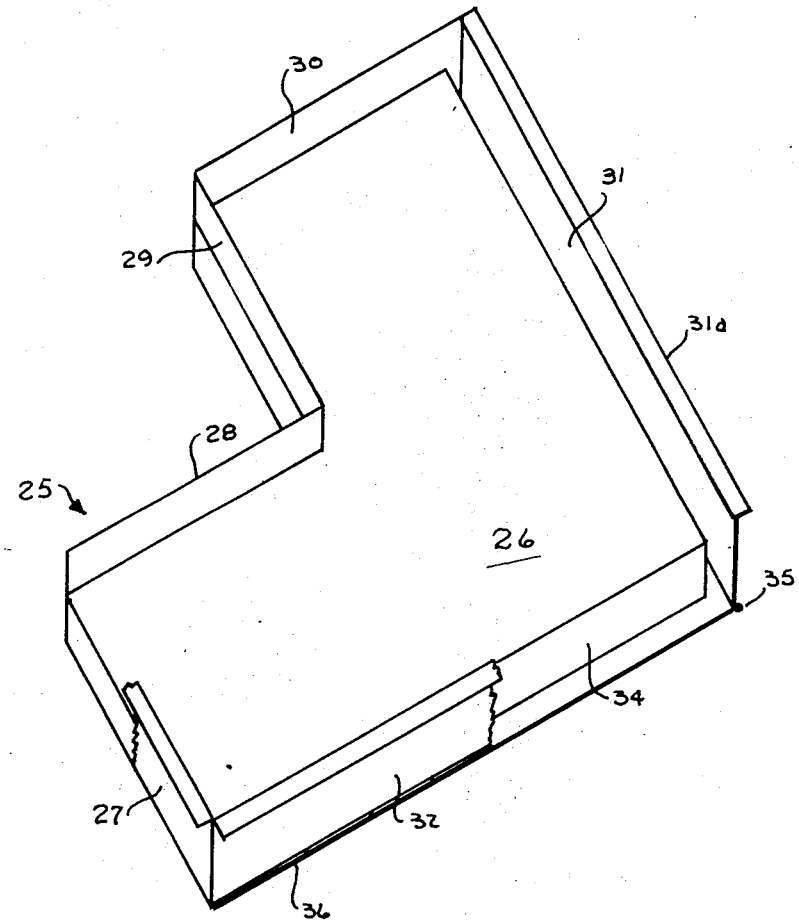
FIG. 3 is a perspective view of apparatus similar to that shown in FIG. 1 for forming a simulated stone counter top of non-rectangular configuration.

The present invention relates to both a method and apparatus for forming simulated stone articles. By simulated stone articles, reference is made to devices which are molded or cast, wherein a viscous mixture is placed in an appropriate mold and cured to a hard condition. Consideration is first directed to the typical ingredients found in the wet mixture of simulated stone articles. Customarily, a plurality of solid particles having a variety of sizes and shapes are included in the mixture for both decor and strength. These products would typically include stone fragments of a variety of sizes, coloring agents, and the like. The sizes may range from granulated color agents having a diameter of perhaps a few microns up to and including stone pieces which will be described very generally or broadly as being gravel-like in size, shape and appearance. It will be appreciated that the colors may be selected to provide special effects, or the colors may be randomly distributed with the intention of forming simulated stone articles having other predetermined effects. It should be noted that the present invention accommodates formation of simulated marble items wherein the solid particles are of micron size and are mixed with the liquid components to be described in an incomplete manner, so as to provide a non-homogeneous mixture. More will be noted concerning this hereinafter.

At the other end of the scale, the simulated stone articles are described hereinafter as being polykrystalon embedded articles incorporating a number of larger stone pieces yielding a desired appearance of roughness and color. Without over-elaborating on this point, it is believed that those skilled in the art will appreciate the broad scope or range of the solid particles added to the liquid components to be noted.

The simulated stone articles manufactured by the present invention are usually placed in a viscous carrier or base which later hardens to a preferably transparent condition. By way of example, a large number of polyester resins are adaptable for use with the present invention. A typical source of polyester resins is the Silmar Company, which provides a number of such resins. At hardness, polyester resins generally evidence a non-flammable characteristic, a texture and hardness rivaling that of natural stones, and usually a translucent or even clear quality for conveying the pattern and colors of the solid particles included therein. It may be found desirable to distribute the solid particles somewhat uniformly throughout the polyester resin, or it may be preferable to segregate the solid particles to obtain an appearance somewhat akin to that of the stones beneath a water surface. On the utilization of micron sized solid particles and coloring agents, the effect may be likened to that of pigments and vehicles such as in paint wherein the lightweight particles are buoyed up during the curing process and provide a generally uniform coloring effect which extends fully throughout the completed article. By way of example, simulated marble is manufactured by placing selected coloring agents in their polyester resin which are incompletely mixed. The striation marks typical of marble are obtained by utilization of contrasting color pigments in the polyester resin which are mixed incompletely with one another to form streaks or intensity variations so typical of the natural product.

A catalyst agent is customarily mixed in the polyester resin to cure it to hardness. An example is the product "Lucidol" which is benzoyl peroxide, or other known curing agents or catalysts are available in channels of commerce for use in polyester resins and are believed within the purview of one skilled in the art.

While the present invention notes the existence of simulated stone articles of the above noted description, attention is preferably directed to the method and apparatus for forming the raw ingredients described above into articles having predetermined size and shape. With this in view, the apparatus shown in the drawings will be first discussed, and thereafter, the methods of use of the present invention will be noted.

Figure 4:
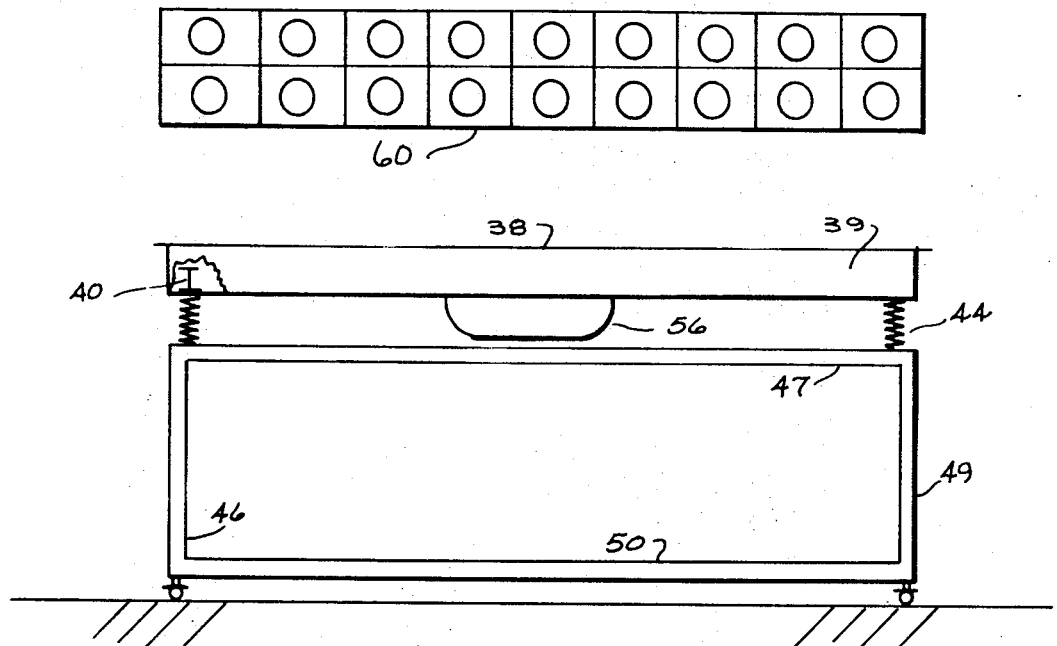
FIG. 4 is a side view of the table of the present invention and the supporting means thereof in cooperation with heat radiating means thereabove.
Figure 5:
FIG. 5 is an end view of the apparatus shown in FIG. 4, illustrating additional details thereof.
Figure 5:
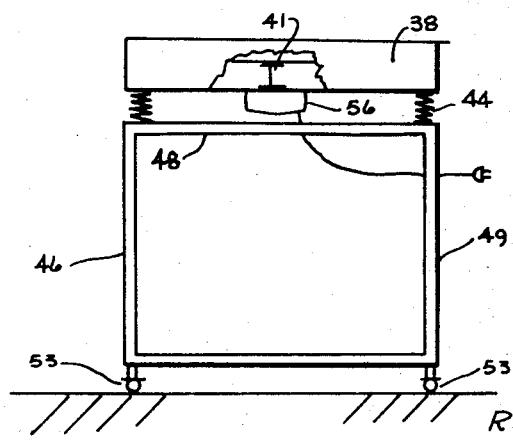

Attention is first directed to FIG. 1 of the drawings which represents the upper portions of a molding table as indicated by the numeral 10. It will be appreciated that the supporting structure is shown in FIGS. 4 and 5 of the drawings and will be described hereinafter. In FIG. 1, an essentially planar molding surface 12 is surrounded by a plurality of retaining walls for forming simulated stone articles. The wall 13 is fully shown in FIG. 1 as well as the wall 14. The wall 15 is shown broken away as in the wall 16. The molding surface 12 has a predetermined size, and is preferably rectangular as shown. The surface 12 is preferably quite large to fabricate large or smaller simulated stone articles. Nominal dimensions of the surface 12 are approximately four feet by eight feet.

The retaining walls 13 through 16, inclusive, preferably extend several inches above the surface 12 for confining the viscous mixture placed on the surface 12. It will be appreciated that the walls extend to a height greater than the thickest simulated stone article desired of the apparatus shown in FIG. 1. In this regard, it should be noted that the method of the present invention accommodates fabrication of the simulated stone articles having thicknesses upwardly of ten or twelve inches. Therefore, the surrounding walls should have adequate height to accommodate a variety of simulated stone articles, and to this end, the walls are perhaps eight inches tall.

The molding surface 12 was described above as being a rectangular surface. In this regard, the walls 13 through 16, inclusive, may abut the molding surface 12 to assist in forming a rectangular article when using the full area. Alternatively, the structure of FIG. 1 forms a generally perpendicularly extending portion with a counter top typically made on the molding table 10 to serve as a back splash when installed in kitchens, baths, and the like. In FIG. 1, means are provided at the volume indicated generally at 18 for forming a back splash, the complete shape being essentially perpendicular to the plane of the article formed on the surface 12. As shown in FIG. 1, the back splash formed in the volume 18 is coterminous with the greater dimension of the completed article although it will be appreciated that the dimensions may vary.

The apparatus of the present invention materially increases speed of fabrication of simulated stone articles. To expedite removal of the completed stone article cast within the molding surface 12 and the walls 13-16, inclusive, preferably one or two of the side walls are hinged to swing away from the completed stone article to facilitate removal from the molding table 10. In further particular, the end wall 15 and the longer side walls 16 are rotatable at their lower edges by piano hinges 20 which facilitate "unsticking" of walls defining the molded member. Ease of removal is further facilitated by use of a wax base mold release material which is customarily coated or sprayed on the surfaces having contact with the stone article to thereby enable the device of the present invention to be quickly separated from the stone article. Sticking of the completed article in the mold is not a serious problem.

The defining walls 15 and 16 are joined to one another and to the stationary walls 13 and 14 by means of trunk latch means 22 shown in FIG. 1. Thus, when the mold 10 is prepared, the trunk latches are latched before the viscous mixture is poured on the molding surface 12.

Attention is next directed to FIG. 2 of the drawings which is a cross-secton taken along the line 2—2 of FIG. 1. In FIG. 2, the walls 13 and 16 are shown in parallel relationship to one another for forming a rectangular member on the molding surface 12. In addition FIG. 2 illustrates the volume 18 which defines the back splash projection extending from the completed stone article.

Attention is next directed to FIG. 3 of the drawings which illustrates an additional molding table 25. The molding table 25 is an irregular shape best described as an L-shape for forming a counter top extending along the wall and around the corner on typical cabinetry found in most homes. The molding surface 26 is bordered by a plurality of side walls 27, 28, 29, 30, 31 and 32. It will be noted that the side walls 27, 28, 29 and 30 abut the molding surface 26. The side walls 31 and 32 are spaced from the surface to define a volume indicated at 34 which extends along the two edges of the molding surface for forming a back splash on the counter top. The volume 34 is similar to the volume 18 provided in FIG. 1 and differs only in provision of the means for forming the back splash on the counter top along two edges. Of course, the back splash means may be omitted from the counter top. In this case, the walls 31 and 32 would abut the edge of the molding surface 26.

Piano hinges 35 and 36 are provided with the walls 31 and 32, respectively, for permitting the walls to swing away from the completed stone article to facilitate removal. Again, the surfaces of the mold means 25 shown in FIG. 3 are preferably coated with a mold release such as a wax based material prior to placing the mixture thereon.

Reference is made to FIG. 2 showing adequate details of construction of the means for forming a back splash with the completed counter top. While FIG. 2 is derived from FIG. 1, those skilled in the art will appreciate the similarities to FIG. 3.

Attention is next directed to FIGS. 4 and 5 of the drawings which illustrate means for further processing the viscous mixture of ingredients to create a simulated stone article. A molding table means 38 incorporates a molding surface (not shown) surrounded by four side walls similar to the wall 39 in FIG. 4. As shown in FIGS. 4 and 5, the side walls are approximately twice the height of the side walls shown in FIGS. 1 and 2 because the portion encases the structural frame support members which will be described.

Structural I-beams support the molding surface as shown at 40 in FIG. 4 and 41 in FIG. 5. In the preferred arrangement, I-beams are preferably placed beneath the longitudinal extent of the molding surface to substantially support the possibly large weight of the liquid ingredients placed thereon. By way of example and not limitation, three I-beams are placed extending the full length of the molding table, with one placed in the center at 41 as shown in FIG. 5, and with additional I-beams at the edges immediately above the springs shown in FIG. 5 as will be described. Additionally cross-framing members are included, such as the frame member 40, at spaced locations along the length of the table 38. By way of example, I-beams located at two-foot intervals will substantially reinforce the molding surface carried on the I-beams. It will be appreciated that the I-beams join flush to the nether side of the molding surface to furnish the desired support to the molding surface and prevent warpage of the completed stone product.

When utilizing a rectangular molding table means 38, spring means 44 are preferably provided at each of the four corners of the molding means 38. The spring means are provided with substantially stiff springs with a short range of compression and have equal deflection one to the other so that the molding surface carried in the table 38 is parallel to the horizontal when unweighted or when weighted with the slurry of materials described. The springs 44 are spaced in a regular manner as shown in FIGS. 4 and 5. The spring means 44 are joined to the structural reinforcing members beneath the molding surface by suitable means such as welding or the like, and are likewise joined to a support frame 46 which includes a number of parallel pieces as will be noted.

The support frame 46 includes two or more horizontal members 47 extending the full length of the table means 38 and transverse bracing members 48 are shown in FIG. 5. The plurality of framing members further includes the vertical corner supports 49. The support frame means 46 also includes lower horizontal members 50 and 51 shown in FIGS. 4 and 5. The horizontal members extend between the corner supports to rigidly maintain the support means beneath the molding table 38. At each of the corners of the support means, wheels 53 enable movement of the molding table about the premises. The wheels or casters 53 are preferably adjustable to accommodate slight leveling variations to obtain the horizontal plane desired for the table means 38.

Attention is next directed to the vibrator means 56 secured at a central location to the reinforcing members beneath the molding surface. Vibrator means 56 is preferably a motor driven device including an off-center weight, which on application of electrical power, vibrates the molding surface and viscous materials thereon.

The vibration serves several functions. In the first instance, it provides a smoothing effect to the upper surface of the flowable materials placed on the molding surface. Moreover, vibrations are an impetus to the solid particles having an adequate size for response to the vibrations and the particles are evenly distributed about the molding surface. This is particularly important to obtain a desired appearance having a consistent or even color pattern within the usually transparent resin when hardened. With this in view, the vibrator means 56 agitates the particles, causing migration within the viscous material.

An additional function of the vibrator means 46 of the present invention is to cause bubbles in the viscous material to rise to the surface as a means of removing entrapped air. In most circumstances, air bubbles entrapped in the completed product are both unsightly and structurally undesirable. Therefore, the present invention vibrates the viscous materials on the molding surface, letting the air bubbles in the viscous materials be dispersed to atmosphere at the surface of the mixture.

Attention is directed to the location of the vibrator means 56, preferably found at a central position as shown in FIGS. 4 and 5. It is desirable that the vibrations be non-directional in effect on the particles in the mixture. That is to say, when the solid particles move in the liquid mixture, they preferably move from a point of accumulation within the viscous mixture to equalize the distribution, and certainly not toward one portion or area of the mold. The resulting product would be unattractive since it would have an excess of solid particles in one portion of the completed product and a deficiency of solid particles in another.

In FIGS. 4 and 5, overhead radiant heat means are provided at 60 for accelerating the curing time of the polyester resin. In the preferred embodiment, two banks of overhead lamps are provided as shown in FIG. 5. They are spaced from one another and parallel to the major axis of the molding table therebelow. As shown in FIG. 4, each of the banks of lamps includes two rows of lamps and reflectors adjacent to one another. In the preferred arrangement, the lamps have 250-watt bulbs centered in suitable reflectors for directing the radiant heat toward the molding surface. The length of the heating means 60 shown in FIG. 4 is sufficient to provide adequate heat to all of the molding table.

The relative spacing of the heating means is indicated in FIG. 5 wherein the heat lamps are preferably some six to eight feet above the floor, and approximately four feet above the molding surface itself.

Figure 7:
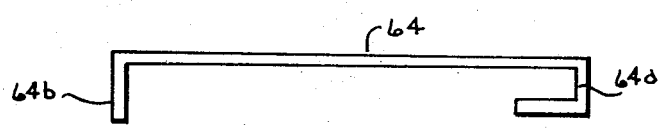
FIG. 7 is a side view of a bracing member adapted to be used with the tables described hereinabove.

At this juncture, little has been noted concerning use of the molding tables other than to indicate the possible use of the full areas in fabricating either rectangular or L-shaped counter tops, either with or without a back splash. For devices of this nature, it is preferable to provide truly parallel sides and to this end, reference is made to FIG. 7 which illustrates releasable reinforcing means 64. A hook 64a engages the lip 31a on the side wall 31 shown in FIG. 3. The downwardly extending portion 64b is spaced from the hook 64a to just reach beyond the opposite parallel side 29 so as to true the sides 29 and 31 relative to one another. The means 64 of FIG. 7 is preferably placed at numerous locations along the length of the molding table.

Up to this point, little has been noted concerning the geometry of the stone article formed by the apparatus previously discussed. The full surface of the molding tables can be used to fabricate counter tops having the indicated dimensions and shapes. However, it will be appreciated that, quite often, it is desirable to make a simulated stone article which is smaller than the full size of the two molding tables previously discussed. Further, it may be desirable to fabricate a stone article which perhaps has non-parallel sides or wherein the corners are something other than right angles. With these goals in mind, means will be described for achieving these results.

Figure 6:
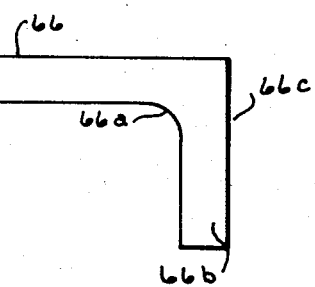
FIG. 6 is a side view of an insert adapted to be placed on the table shown in FIG. 1 for defining one edge of the simulated stone article.

Attention is first directed to FIG. 6 of the drawings which illustrates an edge-defining means 66. The means 66 is equal in width to the width of the molding surface and is adapted to be laid on the molding surface to define one edge of the completed stone product when the full length of the molding surface is not needed. Moreover, the member 66 has a radius of curvature 66a which is shaped to seat snugly against the rolled lip which defines the back splash on the completed product. The extending arm 66b is of sufficient length to abut against the bottom of the volume in which is formed the rolled lip on the counter top. The edge 66c is contacted flush against the inner face of the hinged side wall. Returning again to FIG. 1, should it be desired to form a counter top shorter than the molding surface 12, the edge defining means 66 is placed at a measured location to obtain the desired length. With the edge defining means in view, it will be appreciated that the molding surface 12 is preferably quite long since smaller articles are readily obtained by use of the insert means 66.

The edge defining means 66 is tailored for use with the molding surfaces shown in FIGS. 1 and 3 which incorporate the rolled edge and recessed volume. If the back splash is omitted from the molding tables 10 and 25, then the edge defining means is a straight member of rectangular construction. It is believed that such device need not be illustrated since it is generally similar to the means 66.

Figure 8:
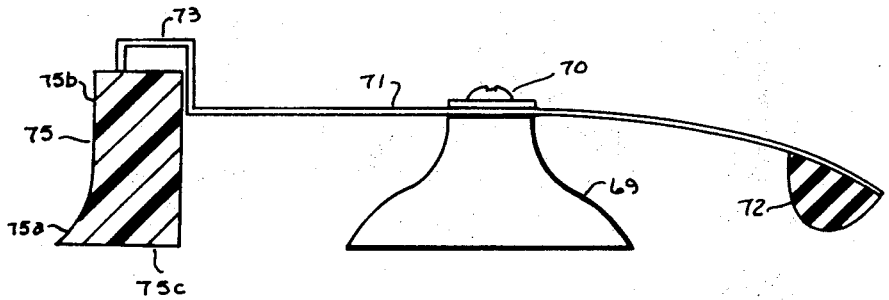
FIG. 8 is a side view of clamping means for securing edge defining means to the molding tables.

Attention is next directed to FIG. 8 of the drawings which illustrates releasable connective means for securing edge defining means on the molding surface. The molding surface is preferably a planar metallic member such as stainless steel. It is generally undesirable to mount apparatus on the surface without destroying the versatility and usefulness of the device. Therefore, it is preferable to use releasable engaging means for securing the edge defining means at a desired location. With this in view, the structure of FIG. 8 illustrates a rubber suction cup 69 which is joined by a means 70 to a finger 71 formed of spring metal. The finger 71 carries a downwardly extending projection 72 which is preferably a rubber bumper joined to the finger 71. Upward pressure on the bumper 72 levers the end indicated at 73 downwardly to clamp the edge defining means. The end 73 is adapted to clamp an edge defining means by pressure on the upper surface or by gripping the upper face. The clamp 73 on the finger 71 is suitable for reaching over the edge defining means 66 shown in FIG. 6. In the ordinary usage of the present apparatus, the means of FIG. 8 is placed at strategic locations adjacent the edge defining means to support the edge defining means against lateral pressure of the flowable mixture.

Attention is next directed to the left-hand position of FIG. 8 which illustrates in sectional view a flexible member 75. The means 75 is a resilient member having the illustrated cross-sectional shape for forming curved, non-straight edges in stone articles. The means 75 is an edge-defining means in the same sense as the means 66 in FIG. 6 except that the means 75 is placed in a predetermined pattern to obtain circles, irregular curves and other shapes.

Figure 10:
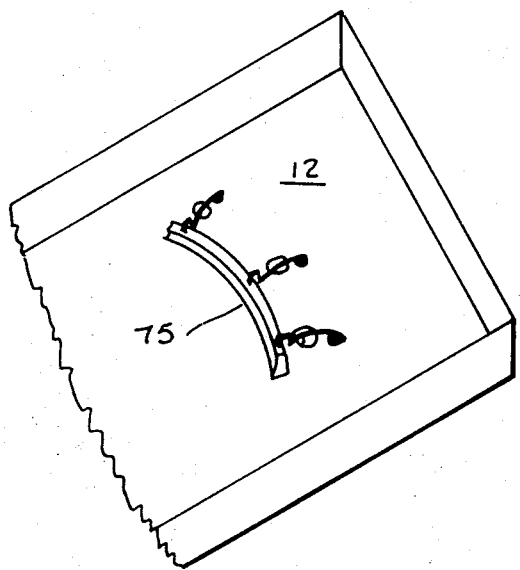
FIG. 10 is a perspective view illustrating the use of the releasable clamping means of FIG. 8 in defining an irregular edge or radius of curvature for a stone article made in accordance with the present invention.

The arrangement shown in FIG. 10 illustrates the means 75 extending across the molding surface 12 to provide a non-straight-line edge to a stone article.

The means 75 is curved slightly at 75a which fairs the side walls 75b into the molding surface so as to obtain a seamless edge along the completed stone article. The face 75c is sufficiently wide to frictionally engage the molding surface to prevent slippage of the member 75 when it is laterally pressured by the wet materials. The cross-sectional shape of the means 75 may be altered to obtain special effects as desired.

The length of the member 75 is essentially indefinite and any portion of the length may be used to obtain desired geometric patterns. The height of the face 75b is likewise subject to variation so long as it is sufficiently tall to prevent overflow of the viscous mixture of materials.

Figure 9:
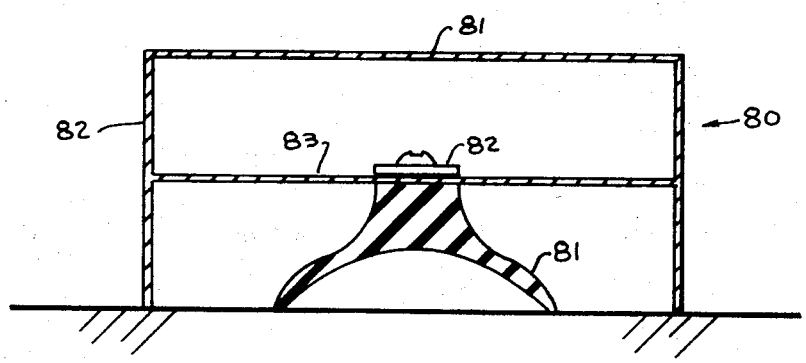
FIG. 9 is a sectional view taken along the diameter of a circular member for forming openings in the finished simulated stone products.

Attention is next directed to FIG. 9 of the drawings which illustrates in sectional view means for forming an opening in a completed stone article. The numeral 80 generally indicates a knock-out plug which forms a circular opening in the completed stone article for mounting plumbing fixtures or the like. The means 80 is either circular or shaped to form an opening of any desired configuration. Briefly, the means 80 incorporates an upper surface 81a and a side wall 82 extending fully thereabout and having the desired contour. Adequate height is provided to the side wall 82 so as to not be submerged by the materials placed on the molding surface. The means 80 includes a rubber suction cup 81 joined by means of a screw and washer 82 to a laterally extending support member 83. The member 83 is joined to the side wall 82 at opposite ends, and is preferably formed of spring material similar to the apparatus shown in FIG. 8. The member 83 urges the suction cup 81 into contact with the molding surface. The side wall 82 is spaced relatively to the edge of the suction cup 81 such that the side wall is pulled snugly against the molding surface to prevent seepage of polyester resin beneath the side wall and into the means 80.

Figure 11:
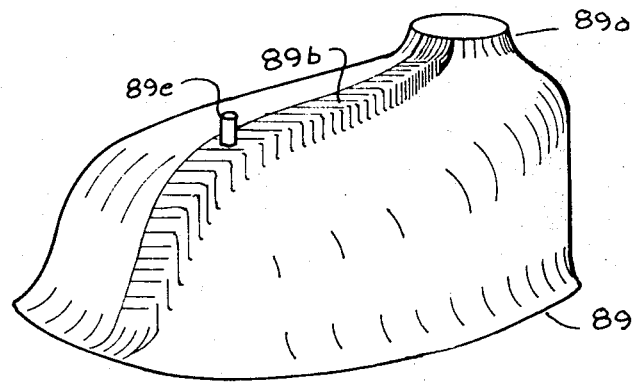
FIG. 11 is a perspective view of mold pieces used in forming an integral sink basin with counter top; and, FIG. 12 is a sectional view of a portion of an integral counter top and sink basin formed in accordance with the present invention.
Figure 11:
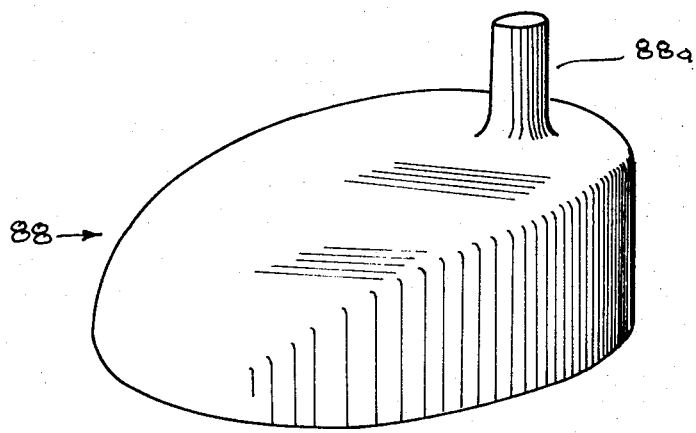

Attention is next directed to FIG. 11 of the drawings. FIG. 11 illustrates a male mold member at 88 in spatial relationship to a female mold member 89 for forming a sink basin. Members 88 and 89 are assembled together, and the volume therebetween defines a sink on hardening the ingredient mixture. Of particular interest is the fact that the neck 88a of the male member extetnds upwardly through the opening at 89a wherein the opening 89a is in a removable portion 89b. The portion 89b enlarges the opening to facilitate insertion of ingredients to the space between the male and female molds until filled. Then, mold piece 89b is placed over the neck and positioned relative to the female mold member 89 to complete the cast basin.

Figure 12:
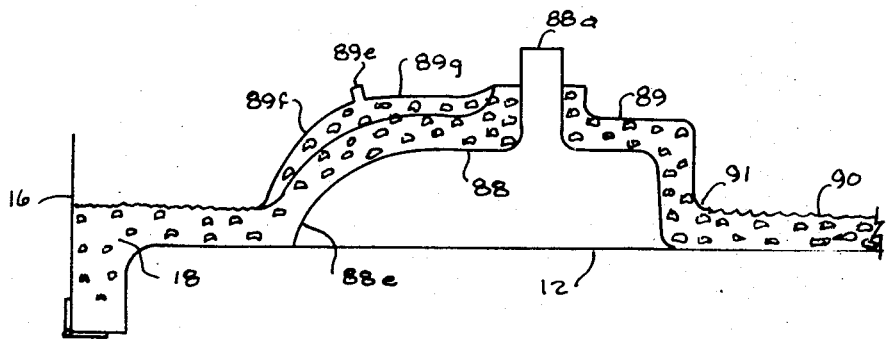

The male and female mold members shown in FIG. 11 are also shown in FIG. 12 in forming an integral counter top and sink basin. In FIG. 12, the molding surface 12 cooperates with the volume 18 for forming an integral back-splash and counter top. Also, FIG. 12 illustrates the male mold 88 in peripheral contact against the molding surface 12 at 88e for defining the perimeter of the basin in the completed stone article. In fabrication, the materials for forming the counter top are poured or otherwise placed on the molding surface 12 at all points to complete the counter top and back splash and extend fully to the edge 88e of the mold member 88 which is initially secured relative to the counter top in an adequate manner to prevent the materials from seeping beneath the male mold member 88. Afterward the liquid ingredients are permitted to slightly cure or harden to obtain a tacky or sticky consistency. At this juncture the female member is pressed downwardly on the tacky material and contacts the material at the perimeter 91 for support. This maintains the female member 89 in spaced relationship to the male mold member 88. The volume enclosed between the male and female members is then filled with additional material. The additional material is added through the opening adjacent the neck 88a and flows to the perimeter 91. As sufficient material is placed in the mold, the removable insert 89b is replaced and the last measure of material is added through the opening 89a adjacent the neck 88a for completing the basin portion of the integral structure.

The female mold member 89 preferably includes an air-escape port 89e which prevents trapping bubbles in the structure of the basin. Likewise, the sink is built up at 89f to provide a reinforcing rib on the lower side of the sink when in the normal position with thebowl facing upwardly. The reinforcing rib 89f is seen in juxtaposition relative to the surface 89g which is shown in FIG. 12. It will be appreciated that the surface 89g is representative of the normal thickness or depth of the bowl material.

While the foregoing has been directed primarily to the apparatus of the present invention, the method should also be described in detail. The ingredients of the simulated stone articles are first mixed in a tumbler or other motor-driven apparatus which provides a homogeneous mixture of polyester resin and solid particles. Also the catalyst is added to the polyester resin to initiate the curing process. Note should be taken of the tumbling apparatus. It should provide sufficient agitation to the polyester resin to thoroughly commingle the solid particles in a uniform manner with the view that the eventual distribution of the mixture of ingredients on the molding surface will provide an even distribution of the solid particles in the completed article. At this juncture, the difference in mixing techniques as between large gravel-like solid particles and small micron size coloring agents should be noted. In the first instance, simulated marble effects can be obtained using the coloring agents of micron-size. As was previously noted, the striation marks found in marble are formed by incompletely mixing the color agents in the polyester resin. Then, on pouring the viscous ingredients on the molding surface, the streaks left in the material as a result of incomplete agitation are also found in the stone article and become set on curing.

Returning again to a mixture of polyester resin binder with larger particles, attention is first directed to the problem of the larger particles congregating at one portion of the molding surface and being unevenly distributed at other points. If a container of polyester resin and large particles is poured onto the molding surface at a single location, the solid particles tend to settle out at the point at which they are poured. Because of this problem, the vibrator means previously noted in FIGS. 4 and 5 evenly distributes the solid particles. The vibration imparted to the molding surface and directly to the ingredient mixture enables the solid particles to flow through the polyester resin before it becomes hardened, and to seek an even distribution.

Note should be taken of the possibility that a simulated stone article may be formed by two or more different batches of ingredients which are poured at different times. For instance, should it be desired to obtain a translucent simulated stone article wherein the particles have an appearance akin to that of stones beneath a body of water, a first layer is placed on the molding surface which includes primarily polyester resin and catalyst without solid particles. This layer is permitted to partially harden to a tacky consistency at which time an additional layer of ingredients is placed thereon. The second layer preferably includes solid particles having the desired colors and quantity. It will be appreciated that multiple layers can be placed one on the other with precautions taken to avoid a lack of cohesion and internal stressing within the layers. The two layer technique noted above is particularly useful for obtaining the appearance of depth as noted above.

In the method of the present invention, the vibrator means noted hereinbefore is helpful in removing bubbles from the viscous mixture. It will be appreciated that the polyester resin has sufficient capability of entrapping air bubbles. By the use of the vibration means, the buoyancy of the bubbles is enhanced and the vibration means are used to drive as many bubbles from the mixture to the surface as possible. The strength of the completed product is considerably improved by removing the bubbles from the mixture.

In the use of the method of the present invention in a mass-production situation, a number of molding tables such as those shown in FIGS. 1–5, inclusive, are used. Each of the tables is prepared by sizing the table by placing the edge defining means thereon at the required locations. Each of the tables is further prepared by placing the conventional parting wax on the surfaces which will be contacted by the liquid mixture. Thereafter, the liquid ingredients are placed on the table to the desired level and the table is then sufficiently vibrated or agitated to evenly distribute the solid particles in the mixture. Also, the vibration tends to remove air bubbles. When the mixture is evenly distributed on the table, the vibration device may be switched off and the table is then translated to a point beneath the radiant heat means for curing. Again, in a mass production situation, the heating means might easily cooperate with a conveyor belt, or traveling chain with hooks for engaging each of the tables to move same beneath a plurality of heat lamps arranged somewhat in the manner shown in FIGS. 4 and 5. By this technique, it is possible to relate the transit time of each table beneath the radiant heaters to the amount of heat required to achieve complete hardening of the materials.

After each table has been exposed to the radiant heaters, the mold defining the shaped article is disassembled and prepared for re-use. Disassembly is best initiated by removing the edge defining means, assuming the entirety of the upper surface of the molding surface is not used. As was previously noted, the molding tables incorporate side walls which are pivotly mounted on piano hinges and which swing away from the completed product to further assist removal of the completed product from the mold. Afterward, the mold is then prepared for re-use by repeating the above noted steps.

Certainly, variations and alterations of the method and apparatus of the present invention can be accommodated. However, the scope of the present invention is defined by the claims appended hereto.

What is claimed is:

1. A method of forming an integral sink basin and counter top of simulated stone suitable for installation in baths, kitchens and the like from a mixture of solid particles of a variety of sizes and shapes carried in a polyester resin having a catalyst mixed therewith, which comprises the steps of:

(a) placing the mixture on a molding surface defined by wall means constructed and arranged to define a counter top;

(b) distributing the mixture fully about the molding surface; the foregoing step being completed at all areas of the molding surface save a portion limited by and defined at the perimeter of the sink basin adjoining the counter top and said material being allowed to cure to tacky consistency;

(c) spatially relating mold pieces defining the sink basin to the molding surface at the perimeter of the sink basin in the counter top, one of said mold pieces being contacted against the molding surface and the other of said mold pieces being spaced from and apart of the mold surface wherein the distance therebetween at least partially determines the thickness of the sink basin and being contacted against the tacky material for at least a portion of its support;

(d) placing additional mixture between the mold pieces defining the sink basin and maintaining sufficient constraints on the flow of the mixture to mold the entirety of the sink basin integrally with the counter top; and, (e) curing the mixture on the molding surface and between the die pieces to hardness to form a unitary counter top with sink basin.

2. The method of claim 1 in which the mixture is placed between mold pieces defining the sink basin as segments of the female mold piece are positioned.

3. The method of claim 1 in which the male mold piece is first positioned on the molding surface and the mixture for forming the counter top is placed on the molding surface and permitted to become tacky after which time the female mold piece is spatially arranged adjacent the male mold piece by contact at its lower perimeter with the tacky mixture forming the counter top.

References Cited

UNITED STATES PATENTS

| | | | |
|---|---|---|---|
| 2,890,492 | 6/1959 | Smith | 264—256X |
| 2,819,495 | 1/1958 | Krausz | 264—245 |
| 3,303,245 | 2/1967 | Trudeau | 264—255 |
| 2,018,192 | 10/1935 | Sexton | 264—71 |
| 3,217,077 | 11/1965 | Cocke | 264—256 |
| 1,162,172 | 11/1915 | Jones | 264 (Nayers Dig.) |
| 3,433,860 | 3/1969 | Ruggles et al. | 264—156 |

ROBERT F. WHITE, Primary Examiner

R. H. SHEAR, Assistant Examiner

U.S. Cl. X.R.

264—69, 245